Figure 1:
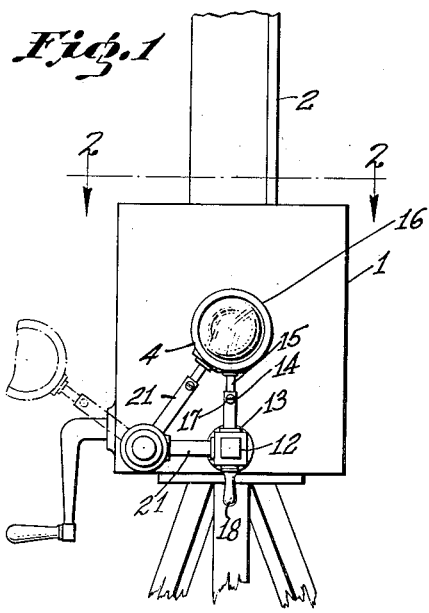

Feb. 19, 1935. J. B. WALKER 1,991,530

DISSOLVE DEVICE FOR CAMERAS

Filed Jan. 12, 1931

INVENTOR
Joseph B. Walker
BY
Calvin Brown
ATTORNEY

Patented Feb. 19, 1935

1,991,530

UNITED STATES PATENT OFFICE 1,991,530

DISSOLVE DEVICE FOR CAMERAS

Joseph B. Walker, Los Angeles, Calif.

Application January 12, 1931, Serial No. 508,089

4 Claims. (Cl. 88—16)

This invention relates to motion picture cameras, and particularly to means whereby certain novel effects may be obtained by the cameraman.

At the present time, it is customary to arrange sequential scenes in a motion picture in such a manner that one set of scenes will merge into the following scene. This so-called act is usually performed in a laboratory. The procedure is generally as follows: The different cameramen "shoot" the different scenes whereupon the negatives are developed and positives made therefrom, after which the sequences are properly chosen and marked during a run of the picture, whereupon the cutters will cut the film in accordance with the sequences selected. The positive is then put together and we have a resultant picture. Of course, this may be done to the negative so that there will be no lapse as far as joining positives is concerned. In order to make the effect pleasing and so that the transition should not be unduly rapid, it is customary to provide what is known as a "dissolve", that is, one picture merges into the other. In the actual taking of a picture, the cameraman may take a given picture, stop the camera, and then carry it to any new location, whereupon the picture is continued. To do this, the cameraman will possibly rewind a portion of the negative already exposed and again expose it to the succeeding picture so that a so-called "dissolve" effect will occur. This, of course, requires a nicety of balance and selection on the part of the cameraman, because light conditions may not be the same at both locations and for the further reason that he must know how much film to rewind before again exposing it at the new location, or for even the same location for a close-up.

The present invention has for an object the provision of means whereby a rewinding of the negative for a portion thereof is unnecessary and where the cameraman may dissolve one picture, move to a new location and gradually bring the new location into sharp focus from said dissolve. I do not of necessity have to move to a new location, as stated above, but I may remain upon the same location for the purpose of bringing a close-up effect, or any other effect contemplated by the invention as hereinafter more definitely set forth.

By way of example, it may be stated that with my invention, I am enabled, through the use of lenses, to have a wide angle field, and likewise, in the second instance, a telephoto view, both of which are capable of recording on a sensitized film in this manner. As an example, I may photograph a given scene and then, without moving the camera bring a close-up of any detail of said scene desired. Within the scope of my invention, I may have a dissolve effect between a wide angle field and the close-up so as to give a pleasing effect to the eye of the observer. All of this is accomplished in a manner that is simple from a structural standpoint and by transposition of lenses.

The device is simple of construction, easy to operate, will produce superior results with a minimum of time and effort, and does not require any particular judgement on the part of the cameraman so far as the dissolve feature is concerned.

A device of the character about to be described could be readily utilized by amateurs and produce successful results and results as highly satisfactory as could be obtained by the most skilled photographer.

Other objects of the invention will be set forth as the specification proceeds, and with the objects above mentioned and others in view, the invention consists in the novel and useful provision, formation, construction, association, and relative arrangement of parts, members, and features, all as disclosed in certain embodiments in the accompanying drawing, described generally, and more particularly pointed out in the claims.

Figure 4:
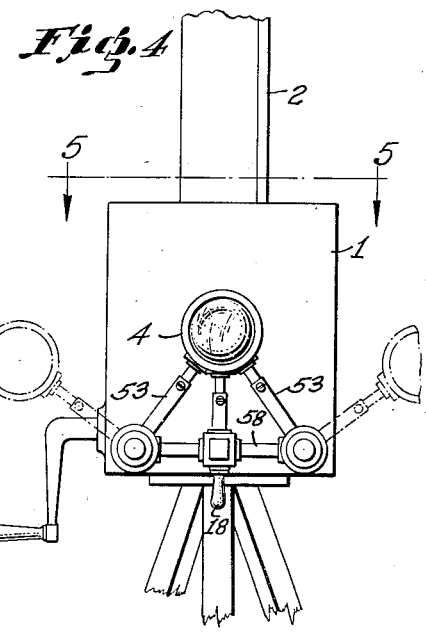
Figure 2:
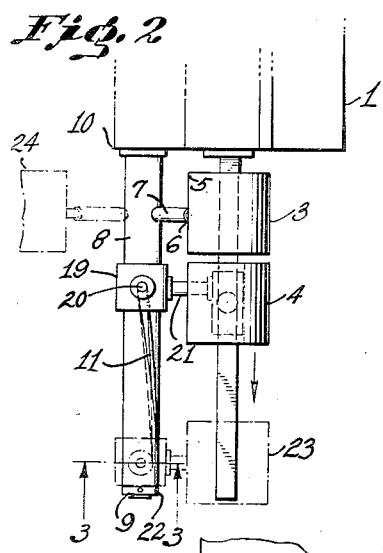
Figure 5:
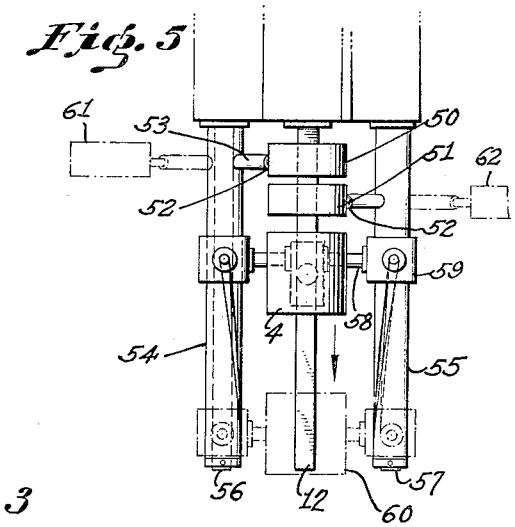
Figure 3:
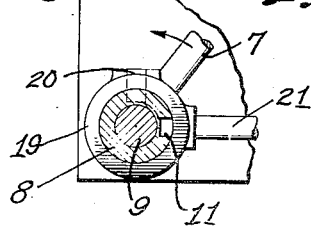

In the drawing:

Figure 1 is a fragmentary front elevation of a camera incorporating one form of the invention, Figure 2 is a view on the line 2—2 of Figure 1, Figure 3 is a sectional view on the line 3—3 of Figure 2, Figure 4 is a front elevation of a modified form of the invention, certain parts being shown fragmentarily, and, Figure 5 is a sectional view on the line 5—5 of Figure 4.

Referring to the drawing, Figures 1, 2 and 3 illustrate one form of the invention, and Figures 4 and 5 a second form, although said forms operate on identically the same principle and in substantially the same manner.

1 represents the usual camera housing adapted to confine the usual camera mechanism, not illustrated. The film magazine is shown at 2 and in all respects the camera would be the same as any type of camera now on the market, regardless of make. However, I change the lens system so as to produce either a clear picture or a dissolve and during the taking of the picture by the cameraman. In order to accomplish this desired result, I have secured to the housing 1 certain mechanism adapted to hold a lens system. For instance, in the illustration of Figures 1 and 2, I have shown a pair of objectives or lenses at 3 and 4. In order to secure these objectives or lenses, the mount 5 of the objective 3 has secured thereto a post 6 telescopically adjustably received within a hollow post 7 and which post in turn is secured to a sleeve 8. This sleeve 8 is rotatively mounted upon a stationary shaft 9 and which shaft is secured to the housing in any approved manner, such as illustrated at 10. The said sleeve is provided with a cam groove 11 which extends for a length of said sleeve.

Extending outwardly from the front of the housing and substantially in parallelism with the shaft 9 is a square support 12 upon which is mounted a slide or carriage 13. This slide or carriage is provided with a tubular post 14 adapted to telescopically receive a post 15 secured to the lens mount 16 for the lens 4. This post 15 is adjustable relative to the tubular post 14 through the medium of a lock screw or the like 17. A handle 18 depends from the slide or carriage 13.

Carried upon the sleeve 8 is a rider 19, which rider is provided with an inwardly extending pin 20 received within the cam groove 11, and an arm 21 extends between the rider and the slide or carriage 13, whereby movement of the slide or carriage upon the square support will cause said rider to move relatively to the sleeve 8 and rotate said sleeve due to travel of the pin 20 within the cam groove 11.

No particular type of lens or objective will be described, as any one skilled in the art to which this invention appertains will readily understand the optical systems employed. In any event, when the rider with its pin is at the limit or end of the cam groove, as illustrated in Figure 2, it is intended that the two lens systems 3 and 4 should be in the same focal plane, or, in other words, the centers of said lenses in axial alignment. When the two lenses are in the position shown in Figure 2, it is intended that the conjugate focus of the two lenses should produce a clear photographic image. When the handle 18 is grasped and the slide or carriage moved away from the face of the camera, the two lenses will separate and, inasmuch as the sleeve 8 will rotate relative to its supporting shaft, the objective or lens 3 swings transversely and away from the focal plane of the lens 4. As this progressively occurs, a gradual dissolve effect results in the photographic image. This will continue until the lens 3 has been completely removed from the focal plane of the lens 4, at which time the lens 4 will be at the extreme of its movement, further movement being stopped by a collar 22 pinned to the shaft 9. Dotted line 23 indicates the final position of the lens 4 and at this position a clear image is again projected into the camera. In other words, there are two positions when the image will be clear, to-wit: when the two objectives are in the full line position of Figure 2 at 3 and 4, and again when the lens 4 is in the position shown at 23, the lens 3 being shown in the dotted line position at 24. Between these two positions, there is a dissolve. The result is that a cameraman may take a given picture either with the lens 4 in its outermost position or at its innermost position. The cameraman may take a given scene, move the lens to dissolve the scene, leave the lens in a dissolve position, move to a new location, start filming the picture and gradually move the lens so as to again bring the picture into sharp focus. As stated in the objects, the cameraman may remain on the same location and movement of the lens 4 to the dotted line position shown at 23 of Figure 2 will give a close-up of any detail desired in said scene or action, whereas the reverse position, to-wit, when the two lenses 3 and 4 are in the same focal plane a wide angle field is provided. It is thus apparent that the objects of the invention are attained by this simple mechanism and without the necessity of rewinding the negative and again "shooting" the picture.

The form of the invention shown in Figures 4 and 5 does not differ essentially from that form just described, save and except that the lens mount shown at 3 is cut in two, as shown at 50 and 51. The lens mounts 50 and 51 are both secured to the posts 52 telescopically adjustably received within hollow posts 53, which posts are in turn fixedly secured to sleeves 54 and 55. These sleeves are spaced apart and independently mounted upon fixed shafts 56 and 57, the shafts being secured to the camera housing 1. As before, the lens 4 is provided and is slidable upon a square support 12 through the medium of the same mechanism as shown in Figures 1 and 2. The only difference would be that an extra arm 58 extends from the slide or carriage to a rider 59 for the sleeve 55. Cam grooves 11 are provided in the sleeves 54 and 55 the same as for the sleeve 8. When the lens 4 is moved outwardly to the dotted line position at 60, both sleeves 54 and 55 are rotated and which rotation has caused the lenses 50 and 51 to be moved to the dotted line position shown at 61 and 62. In any event, the result accomplished by the form of the invention shown in Figures 4 and 5 is identical with that accomplished by the form of the invention shown in Figures 1 to 3, inclusive.

While I have shown the invention in its primary aspect, it is to be understood that the lenses are enclosed within a suitable bellows for keeping out the light, and as a matter of fact, the lens 3 in the showing of Figure 2, and the lenses 50 and 51 do not swing as far outwardly as indicated by the dotted lines of Figure 5 at 61 and 62. This position is an exaggeration for the purpose of clearness so that the invention may be understood.

It will be borne in mind that the aggregate lenses produce a composite picture and that any one of the lenses, when removed from cooperation with other lenses, will produce the dissolve or the fade, or such other type of picture as may be desired, and that the lens system as disclosed herein is an unitary arrangement with the lenses used singly or in the combination as stated.

It is obvious that various changes and modifications and variations may be made in practicing the invention in departure from the particular showing of the drawing and the description as given without departing from the true spirit thereof.

I claim:

1. In a photographic device, two objectives, means for slidably mounting one of said objectives, shiftable means supporting the second objective, and means between the first and second objective for gradually shifting the shiftably supported objective into and out of the focal axis of the other objective during sliding movement thereof.

2. In a photographic device, two objectives, a support, a slide mount for one of said objectives movable on said support, a rotatable sleeve, the other objective secured to said sleeve, and means between the said sleeve and the first objective functioning to rotate the sleeve when the mount of the first objective is moved upon its support to in turn transversely shift the second objective into the focal axis of the first objective when the first objective is in one position and to shift the second objective out of the focal axis of the first objective during movement of the first objective in one direction.

3. In a device of the character disclosed, a support, two objectives, one objective provided with a slidably supported mount for axial movement, said other objective being mounted for transverse shifting relative to the axis of movement of the first objective, and means between the mounts for both objectives whereby gradual movement of the slidably supported objective produces transverse movement in the other objective.

4. In a device of the character disclosed, two spaced apart supports, a sleeve carried on one of said supports, an objective secured to said sleeve, a second objective provided with a mount movable upon the other support, and means between said sleeve and said mount for the second objective whereby movement of said second objective in one direction rotates said sleeve to in turn shift the first objective transversely into and out of the focal axis of the second objective.

JOSEPH B. WALKER.